United States Patent [19]

Yamamoto

[11] Patent Number: 4,626,077

[45] Date of Patent: Dec. 2, 1986

[54] LENS MOUNT WITH BUILT-IN MOTOR

[75] Inventor: Hiroshi Yamamoto, Kanagawa, Japan

[73] Assignee: Canon Kabushiki Kaisha, Tokyo, Japan

[21] Appl. No.: 610,387

[22] Filed: May 15, 1984

[30] Foreign Application Priority Data

May 20, 1983 [JP] Japan .................. 58-89780

[51] Int. Cl.⁴ .............................. G02B 7/11
[52] U.S. Cl. .................................. 350/429
[58] Field of Search .................. 350/429, 255

[56] References Cited

U.S. PATENT DOCUMENTS

| | | | |
|---|---|---|---|
| 4,083,057 | 4/1978 | Quinn | 350/429 |
| 4,152,060 | 5/1979 | Specht | 350/255 |
| 4,472,033 | 9/1984 | Fukuhara et al. | 350/429 |
| 4,482,986 | 11/1984 | Noda et al. | 350/255 |
| 4,482,988 | 11/1984 | Tsurushima et al. | 350/255 |
| 4,491,396 | 1/1985 | Isobe et al. | 350/429 |

*Primary Examiner*—John K. Corbin
*Assistant Examiner*—Loha Ben
*Attorney, Agent, or Firm*—Toren, McGeady, Stanger, Goldberg & Kiel

[57] ABSTRACT

A mechanical mounting for a lens system having a focusing or a zoom component. A motor for driving a lens holder for the component includes a field coil of hollow cylindrical shape drivingly connected to the lens holder for the component and rotatably fitted on a circular array of field magnet elements which are secured to a tubular body. The holder is moved axially within the tubular body by the motor.

5 Claims, 6 Drawing Figures

LENS MOUNT WITH BUILT-IN MOTOR

BACKGROUND OF THE INVENTION

1. Field of the Invention

This invention relates to lens mountings and more particularly to lens mountings having incorporated therein a motor in the hollow cylindrical form of a field coil and a field magnet.

2. Description of the Prior Art

Many proposals have been made for using an electromagnetic induction mechanism to move a member or unit within the interior of a lens barrel.

For example, U.S. Pat. Nos. 3,687,042 and 4,113,359 disclose a diaphragm unit in a lens mounting operated by an electromagnetic induction mechanism.

Also, a small-sized D.C. motor has been incorporated in a lens mounting of cine cameras to serve as the motorized operating mechanism for the focusing lens. The drive torque of this motor is transmitted through a gear train to the lens holder so that the lens moves axially.

Prior art motorized focusing mechanisms have the problem that the necessity of putting the motor on the outer barrel of the lens mounting makes the outer appearance of the housing of the lens mounting awkward. Common usage of the term "lens barrel" as meaning integrally cylindrical gives the above-described prior art mechanisms the impression of incompatability so they are not preferred industrial designs. Another problem is that the increased complexity of prior art mechanical mountings results in design and manufacturing disadvantages.

It is also known to apply the principles of linear motors to control axial movement of the focusing lens, as disclosed in U.S. patent application Ser. No. 396,030 filed July 7, 1982 (corresponding to Japanese Laid-Open Patent Application No. SHO 58-10706 published Jan. 21, 1983). In this linear motor lens drive mechanism, the axial length of the stator of the motor must be elongated depending upon the range of movement of the focusing lens. Further, fine position adjustment of the focusing lens is also difficult to achieve.

Another type of focusing mechanism for an objective lens is disclosed in U.S. Pat. No. 4,152,060. This patent discloses an epicyclic motor which has a stator concentric to the optical axis and a tube shape armature eccentric to the optical axis. Upon energization, the armature epicyclically rotates relative to the stator. A lens holder having a central axis substantially coincident with the optical axis of the lens contained in the holder is rotatably mounted in the interior of the tubular armature through an intermediate sleeve. The center of rotation of this sleeve is concentric to the optical axis. When the intermediate sleeve rotates, the lens holder is driven axially. This patent thus discloses a focusing mechanism with a drive connection between the armature and the lens holder to transmit epicyclic motion of the armature to rotate the lens holder. Because of this complicated structure, the assembling and adjusting operations of the lens mounting production line are very difficult to carry out.

To mount a lens of circular lateral cross-section, the lens holder, the stationary body, the actuator for the focusing component and/or zoom component, the helicoid member, the cam member, and all other constituent parts should have a circular lateral cross-section. For this reason, the artisan has been seeking a technique that allows the drive source for the focusing or zoom component to be constructed with parts of tubular form compatible with the constituent parts of the lens mounting. This would provide an elegant outer appearance without any awkward protuberance.

Such a technique has been disclosed in Japanese Laid-Open Patent Application No. SHO 57-186738 published Nov. 17, 1982. This prior known lens mounting has a lens holder sleeve including a group of lens elements arranged to be moved axially as a unit. An air space is provided near the lens holder. A motor is positioned in this air space and fixedly secured to the lens holder. When the motor is energized, the holder sleeve with the group of lens elements is driven to move axially as a unit with the motor to effect either focusing or zooming of the photographic object. In one illustrated embodiment of the prior known invention, the motor for driving the lens has a hollow cylindrical form.

SUMMARY OF THE INVENTION

An object of the present invention is to provide a mechanical mounting for a lens system with a lens drive motor similar to that shown in Japanese Laid-Open Patent Application No. SHO 57-186738.

Another object is to provide such a motor with a field magnet, a field coil and a field yoke, each of which has a tubular shape, so that the motor is snugly seated in a space defined by the tubular body, focusing actuator, zoom actuator, cam ring and lens holder, which constitute part of the mechanical mounting.

Still another object is to provide a mechanical mounting for a lens system capable of operating with either manual or automatic control for the focusing lens or zoom component.

DETAILED DESCRIPTION OF THE PREFERRED EMBODIMENTS

Figure 1:
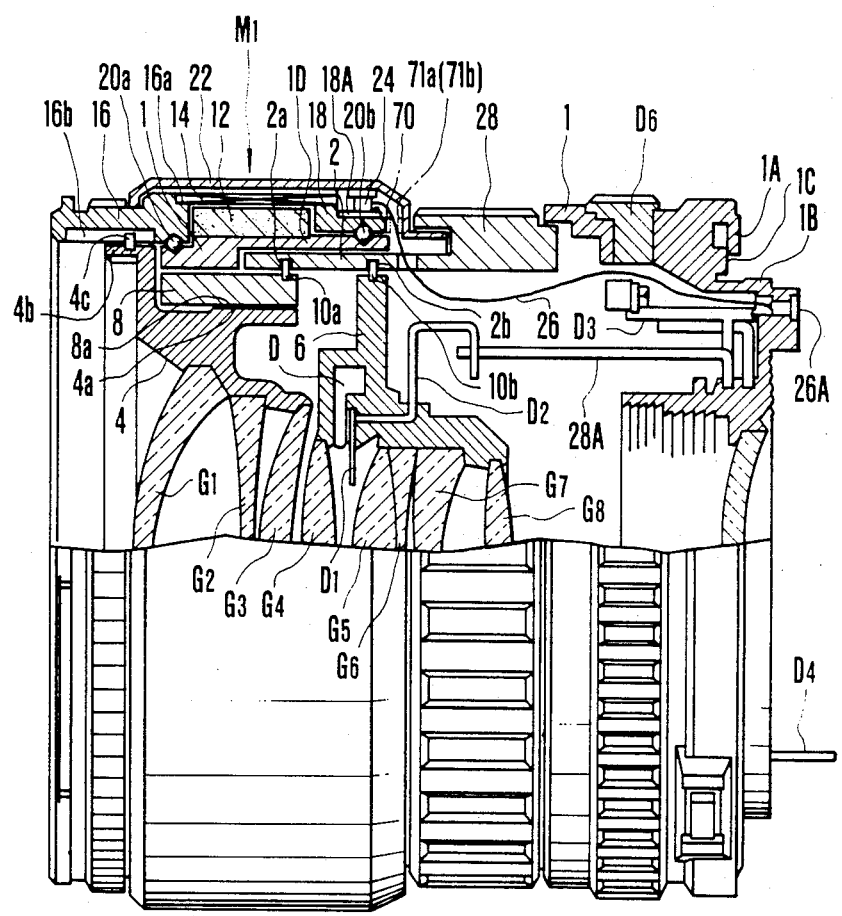
FIG. 1 is an elevational view of a first embodiment of a mechanical mounting according to the present invention with a portion broken away to illustrate the detail of a coreless motor used in a focusing mechanism.

In FIG. 1 there is shown an embodiment of the invention applied to a motorized focusing control mechanism. A tubular body 1 made of magnetic iron material has at the rear end thereof a bayonet coupling ring 1A with a shell 1B, an abutment surface 1C and a radially thinned portion 1D, whose inner diameter is fitted with a cam sleeve 2 having two camming grooves 2a and 2b. Fitted in the inner diameter of the cam sleeve 2 are first and second lens holders 4 and 6. An intermediate helicoid sleeve 8 is positioned between the first lens holder 4 and the body tube 1 and has an inner threaded portion 8a meshing with an outer threaded portion 4a of the first lens holder 4. A drive connection pin 10a extends radially from the intermediate helicoid 8 into the first camming groove 2a. A second drive connection pin 10b extends radially from the second lens holder 6 into the second camming groove 2b.

The first lens holder 4 contains lens elements G1, G2 and G3, and the second lens holder 6 contains lens elements G4 to G8. Lens elements G1 to G8 constitute a photographic lens system. The lens elements G1, G2 and G3 constitute a first group, and the lens elements G4 to G8 constitute a second group. The first lens group functions not only as the focusing lens but also as the variator of the zoom lens, and the second lens group functions as the compensator.

A field magnet 12 of tubular form is fixedly fitted on the outer diameter of the body tube 1. A field coil 14 is formed in a similar fashion to that in which the coil of the coreless motor is made up.

A focusing actuator 16 in the form of a ring has a circumferential recess 16a formed in the rear outer corner thereof. Fixedly mounted in this recess 16a by an adhesive agent is the front end of the field coil 14. The focusing ring 16 has an axially elongated groove 16b in the inner surface thereof into which a third drive connection pin 4c extends radially outwardly from an annular extension 4b at the front of the first lens holder 4. The linear groove 16b and pin 4c constitute means for transmitting driving torque of the motor to the lens holder 4.

A number of commutator segments 18A made of resin material by molding techniques are mounted to the outer periphery of a smaller diameter portion of a commutator holder 18. A larger diameter portion of commutator holder is fixedly fitted in the inner diameter of the opposite end portion of the field coil 14.

The focus actuating member 16, field coil 14 and commutator holder 18 each are formed in a hollow cylindrical shape and are rigidly combined with the field coil 14 at the center of the longitudinal length to form a rotor. This rotor is mounted through ball bearings 20a and 20b to the body tube 1.

An outer barrel 22 covers the rotor and is fixedly secured to the body tube 1. Fixedly mounted to the inner surface of the cover 22 are brush members 24 in sliding contact with the commutator 18A. These brush members 24 are electrically connected through wires 26 to electrical signal contacts 26A in the adapter 1B.

A zoom actuator ring 28 is rotatably fitted on the body tube 1 behind the cover 22 and has an arm 28A connected to the cam sleeve 2.

Element D denotes a diaphragm unit including a number of blades D1 defining an aperture opening of variable size, a member for holding the blades, a control ring D2 for moving the blades, and a cam ring for adjusting the size of aperture opening of the diaphragm blades, as is well known in the art. D3 and D4 are aperture information transmitting members for giving aperture information to the camera. D6 is a diaphragm presetting ring.

The FIG. 1 lens mounting mechanism may be operated either manually by turning the focusing actuator ring 16, or automatically by the coreless motor M1, to axially move the first lens group G1-G3 alone. Motorized focusing may be carried out in two different ways. One way is that, with the lens mounting of FIG. 1 attached to the camera body, the photographer, while looking through the finder, operates a current supply switch (not shown) in connection with the motor M1 until an image of an object is brought into sharp focus. The degree of sharpness of the image changes with movement of the first lens group. Another motorized focusing technique is with the use of an image sharpness sensor, which automatically establishes the in-focus condition.

Figure 2B:
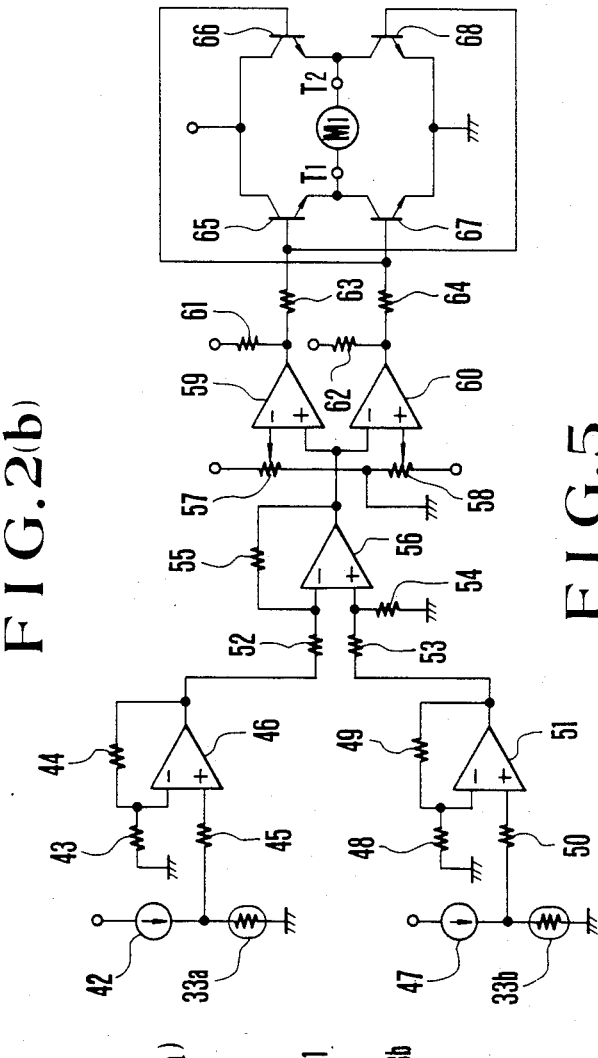
FIGS. 2(a) and 2(b) are respectively a sectional view and an electrical circuit diagram of an automatic focus detector and a motor drive control circuit usable in the lens mounting of FIG. 1.
Figure 2A:
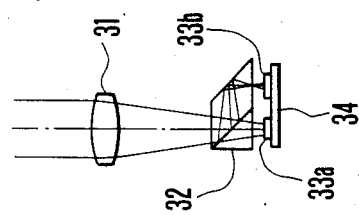

FIG. 2(a) illustrates an example of the image sharpness sensor unit, and FIG. 2(b) illustrates a drive control circuit for the motor M1, both of which can be used with the lens mounting of FIG. 1. This circuit is shown in Japanese Laid-Open Patent Application No. SHO 55-155337.

Referring to FIG. 2(a), the image sharpness sensor unit includes a relay lens 31 positioned in a light beam split off from the light emerging from the lens system in the mounting of FIG. 1, a beam splitter 32, and two photoelectric transducer elements 33a and 33b on a common substrate 34.

Referring to FIG. 2(b), a circuit for controlling the operation of the motor M1 in accordance with the outputs of the photoelectric transducer elements 33a and 33b includes constant current sources 42 and 47, elements 43 to 46 and 48 to 51 constituting non-inversion amplifier circuits, elements 52 to 56 constituting a difference amplifier, elements 57 to 62 constituting a window comparator, and transistors 65 to 68 connected to each other to form a bridge for controlling the direction of rotation of the motor M1. When the output of the comparator 59 is of H level, the transistors 65 and 68 are in the conducting state. When the output of the comparator 60 is of H level, the transistors 66 and 67 are in the conducting state. Elements 63 and 64 are protection resistors for limiting the current to these transistors. T1 and T2 are connection terminals arranged to be in contact with the respective electrical signal contacts 26A when the lens mounting of FIG. 1 is attached to the camera body. The sensor unit of FIG. 2(a) and the drive circuit of FIG. 2(b) are incorporated within the camera housing.

In operating the circuit of FIG. 2(b), the outputs of CdS's 33a and 33b are applied through their respective non-inversion amplifiers to the difference amplifier 56. The output of amplifier 56 represents the difference between the degrees of sharpness of the images formed on the CdS's 33a and 33b and is applied to the window comparator, which includes two variable resistors in which two threshold values are preset. When the sharpness difference falls in between these threshold values, an acceptable range of in-focus conditions, the comparators 59 and 60 both produce outputs of low level. Therefore, the transistor bridge is balanced so that the motor M1 is not energized.

Now suppose the output of the difference amplifier 56 lies outside the range of the two threshold values. For example, if the sharpness difference is larger than the upper limit, then the output of the comparator 59 is H level, and the output of the comparator 60 is L level. Therefore, the transistors 65 and 68 are turned on so that the motor $M_1$ rotates, for example, in a clockwise direction. Conversely, when the sharpness difference drops below the lower limit, the outputs of the comparators 59 and 60 are changed to L and H level, respectively. Therefore the transistors 66 and 67 are turned on so that the motor M1 rotates in the counterclockwise direction.

In the focusing operation of the lens mounting mechanism of FIG. 1, using the automatic focus adjusting device of FIGS. 2(a) and 2(b), the circuit of FIG. 2(b) produces an output signal representing, for example, the clockwise rotation of the motor M1. This output signal appears at the outlets T1 and T2 and enters the contacts 26A of the lens mounting of FIG. 1. Therefore, current is supplied through the electric cables 26 and the commutator 18A to the field coil 14, rotating the rotor composed of the coil 14 and commutator holding member 18 along with the focusing actuator ring 16. Rotation of the ring 16 is transmitted through connection of the pin 4c and groove 16b to axial movement of the first lens holder 4, leaving the intermediate or helicoid sleeve 8 stationary.

As the focusing lens group G1–G3 moves, the light impinging on the image sharpness sensor unit of FIG. 2(a) is changed. When the degree of sharpness of the image attains the critical level defined by the window comparator, the current supply to the motor M1 is cut off and movement of the focusing lens group is stopped.

In this embodiment, the use of ball bearings 20a and 20b provides a smooth rotation of the rotor.

To change the focal length of the lens system in the mounting of FIG. 1, the photographer turns the zoom actuator ring 28. This causes simultaneous rotation of the zoom sleeve 2, which in turn causes the intermediate helicoid sleeve 8 and the second lens holder 6 to move axially in different relation to each other through the respective camming grooves 2a and 2b. Therefore the first lens group and the second lens group move to effect zooming.

Automatic adjustment of the focusing lens in the lens mounting of FIG. 1 might be otherwise made by sensing the position of the focusing lens as measured from, for example, either one of the terminal ends of movement thereof, which correspond to the minimum and infinite object distances respectively. A signal representing the actual position of the focusing lens is sent to a range finder. The range finder computes the distance the focusing lens must be moved to bring the image into sharp focus as either an amount of electrical current to be supplied to the motor M1 or a period of energization thereof. When such a focus adjusting method is employed, the amount of rotation of the rotor must be detected by means including a pulse generator. FIG. 1, includes a light projector 71a, a reflection plate 70 and a light receiver 71b. The light projector 71a is fixedly mounted to the flange of the cover 22, the reflection plate 70 is fixedly mounted to the rear end of the tubular portion of the commutator holder 18, and the light receiver 71b to the aforesaid flange surface.

Figure 3:
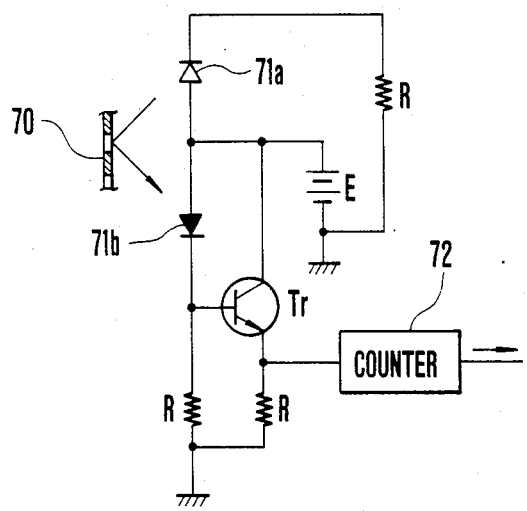
FIG. 3 is an electrical circuit diagram of a pulse generator.

FIG. 3 illustrates a pulse counter circuit comprising a transistor Tr, a counter 72 and resistors R all of which are fabricated on a suitable printed circuit plate and are operated by an electrical power source or battery E.

Figure 4:
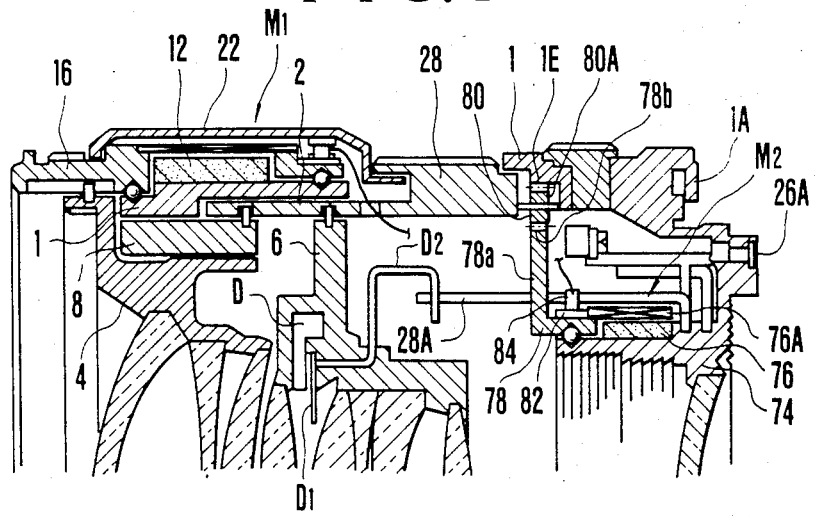
FIG. 4 is a fragmentary sectional view of a second embodiment of the mechanical mounting according to the present invention using a coreless motor in the zoom mechanism.

FIG. 4 illustrates a second embodiment of the present invention applied to a motorized zoom lens. In FIG. 4, those parts denoted by reference numerals 1 (tubular body) to 28 (zoom actuator) are similar to those shown in FIG. 1 and, therefore are no more described below.

A relay lens holder 74 is fixedly mounted to the coupling member 1A. A hollow cylindrical field magnet 76 is secured to the rear half of the relay lens holder 74. A rotatable ring 78 is fitted on the front half of the holder 74 and has secured to it a second field coil 76A. The rotatable ring 78 and the field coil 76A constitute a rotor. A sector arm 78a extends radially outwardly from rotatable ring 78 and has a toothed portion 78b in the outer periphery thereof which meshes with a pinion gear 80. The pinion gear 80 meshes with rack 1E formed on the inner peripheral surface of the body tube 1. A shaft 80A on which the pinion gear 80 is rotatably mounted is fixedly mounted to the zoom actuator ring 28. A commutator 82 is fixedly mounted to the outer peripheral surface of rotatable ring 78 and kept in sliding contact with brushes 84 fixed to a suitable stationary portion of the lens mounting and electrically connected through cables to inlets in the coupling ring 1A.

Figure 5:
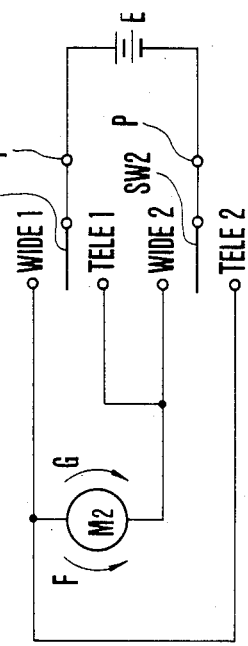
FIG. 5 is a zoom drive circuit.

FIG. 5 illustrates a drive circuit for the motor M2 in the zoom lens mounting mechanism of FIG. 4. The inlets of the motor M2 are connected through switches SW1 and SW2 to the positive and negative terminals P of a battery E. The switches SW1 and SW2 are arranged to cooperate with each other.

In operating the zoom lens mounting mechanism of FIG. 4 attached to the camera body, when the switches SW1 and SW2 are in their wide angle positions, shown in FIG. 5 as wide 1 and wide 2, electrical current is supplied to the motor M2 so as to rotate in a direction indicated by arrow F. Therefore, as the field coil 76A is supplied with current, the rotatable ring 78 rotates on the outer periphery of the relay lens holder 74. As the arm 78a of the ring 78 swings, the pinion gear 80 also rotates in mesh with the rack 1E, and the zoom actuator ring 28 turns about the optical axis. Rotation of the zoom ring 28 causes rotation of the cam sleeve 2, which causes the first lens group and the second lens group to move axially in different relation to each other while shortening the focal length of the entire system.

To set the zoom lens in telephoto positions, the photographer needs only to push the switches SW1 and SW2 toward the TELE 1 and TELE 2 positions shown in FIG. 5.

With the mechanism of FIG. 4, letting N1 denote the number of teeth of the gear 78b of the rotary ring 78, and N2 the number of teeth of the inner gear 1E, for one revolution of the rotary ring 78, the zoom ring 28 rotates $1/(1+N2/N1)$. This means that the zoom ring 28 rotates at a slower speed than rotary ring 78. Since the speed reduction is, therefore, constant, the zooming speed can be varied as desired by adjusting the speed of rotation of the motor M2.

As has been described above, according to the present invention, a field magnet 12, 76 of hollow cylindrical shape is fixedly mounted to a field yoke 1, 74 of hollow cylindrical shape. A coreless coil 14, 76A of hollow cylindrical shape is arranged outside the magnet in concentric relation and is fixedly mounted to the focusing actuator member 16 or the rotary ring 78.

Such form and construction and arrangement of the rotor and stator of the coreless motor M1, M2 as the drive source for the focusing actuator or zoom actuator leads to the possibility of carrying out motorized focusing or zooming of the lens system G1–G8 without involving an unduly large modification of the rules of design for the lens mounting mechanism.

Though the embodiments of FIGS. 1 and 4 have been described in connection with the placing of the field magnet 12, 76 and field coil 14, 76A in such relationship that the field magnet is inside and the field coil is outside, this relationship may be inverted. If so, in the case of the lens mounting of FIG. 1, the field magnet 12 is fixedly mounted to the inner surface of the cover 22, while the field coil is arranged concentrically inside the field magnet.

What I claim:
1. A lens mounting comprising:
(a) a body tube of magnetic material;

(b) a focusing lens and a first lens holder containing said focusing lens, said first lens holder being movably arranged in said body tube;

(c) a focusing actuator member for driving said focusing lens;

(d) a motor for driving said lens holder, said motor including a field coil of hollow cylindrical shape, a field magnet, a commutator for supplying current to said field coil, a brush and electric lines, said field coil being secured to one end of said focusing actuator member in parallelism to a direction parallel with an optical axis, a holder containing said commutator being secured to the opposite end of said field coil in series in a direction parallel with the optical axis, said field magnet being positioned between said field coil and said body tube and secured to said body tube; and (e) means for transmitting one of the driving torque from said focusing actuator member and the rotation of said field coil to said first lens holder.

2. A lens mounting according to claim 1, further comprising:

(a) a zoom lens optical system, said zoom lens optical system including a variator lens and a compensator lens, said variator lens also serving as said focusing lens;

(b) a second lens holder containing said compensator lens;

(c) a zoom actuator member;

(d) a cam member movably arranged in said body tube and drivingly connected to said zoom actuator member;

(e) drive connection means including a plurality of cams formed in said cam member and responsive to rotative movement of said cam member for moving said variator lens and said compensator lens axially in differential relation;

(f) an intermediate sleeve; and (g) said cam member operating said intermediate sleeve in helicoid mesh with said first lens holder through said drive connection means, said cams formed in said cam member being responsive to rotative movement of said cam member for moving said variator lens and said compensator lens axially in differential relation.

3. A lens mounting comprising:

(a) a body tube made of magnetic materials;

(b) a focusing actuator sleeve for driving a focusing lens;

(c) a holder containing the focusing lens, said lens holder being connected to said focusing actuator sleeve through drive connection means so that said lens holder is moved by the operation of said focusing actuator sleeve;

(d) an electromagnetic drive mechanism including a field coil of hollow cylindrical shape, a permanent magnet, a commutator, a holder containing said commutator, and a brush, said field coil of hollow cylindrical shape being secured to one end of axial length of said focusing actuator sleeve, and said commutator holder being secured to the opposite end of said field coil, said commutator being mounted on the outer periphery of said commutator holder, and said commutator abutting on said brush, said focusing actuator member and said commutator holder being smoothly rotatable relative to said body tube by a bearing member.

4. A lens mounting according to claim 3, wherein the field coil is arranged concentrically outside the field magnet.

5. A lens mounting comprising:

(a) a first lens having a focusing function and an image magnification varying function, a second lens having an image shift compensating function, said first and second holders containing said first and said second lenses respectively;

(b) a body tube made of magnetic material;

(c) a focusing actuator member, said focusing actuator member being connected to said first lens holder in slot-and-pin relation;

(d) a cam sleeve having cams for moving said first and second lenses in differential relation, said cam sleeve being fitted inside said body tube;

(e) an intermediate sleeve positioned between said cam sleeve and said first lens holder, said intermediate sleeve being in helicoid connection with said first lens holder, and cam followers planted on said intermediate sleeve for engaging said cams of said cam sleeve;

(f) electromagnetic drive means including a field coil of hollow cylindrical shape, a permanent magnet, a holder containing a commutator, a brush for supplying current to said commutator, said field coil being arranged in secured relation at its one end to said focusing actuator member and at its opposite end to said commutator holder in series to a direction parallel with an optical axis, said permanent magnet being arranged between said field coil and said body tube, said focusing actuator member and said commutator holder being rotatable relative to said body tube by bearing means;

(g) a cam follower extending from said second lens holder to engage with a cam of said cam sleeve.

* * * * *